Patented Feb. 13, 1951

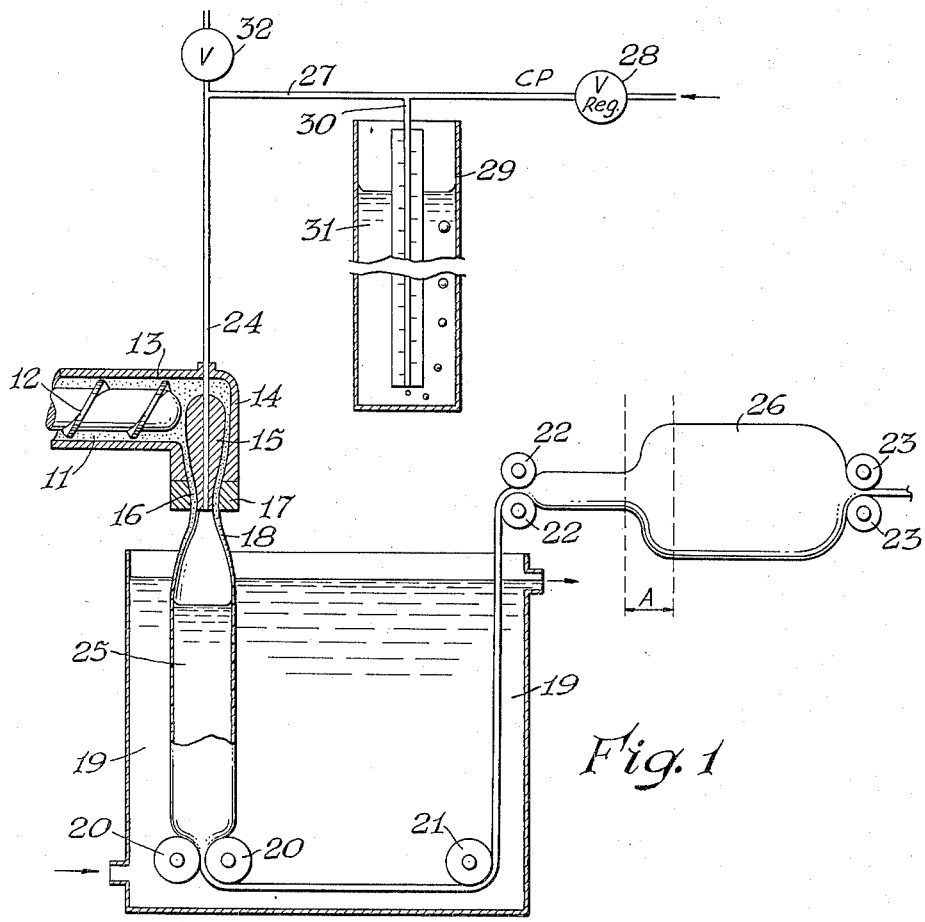
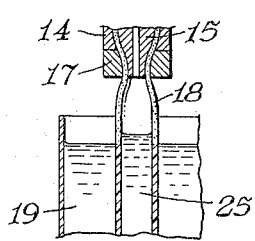
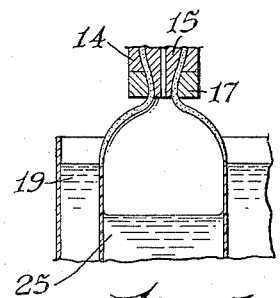

2,541,064

UNITED STATES PATENT OFFICE 2,541,064

METHOD OF CONTROLLING THE DIAMETER AND WALL THICKNESS OF VINYLIDENE CHLORIDE POLYMER FILM TUBES

Carroll R. Irons, Midland, Mich., assignor to The Dow Chemical Company, Midland, Mich., a corporation of Delaware Application August 11, 1948, Serial No. 43,643

1 Claim. (Cl. 18—47.5)

This invention relates to a method of controlling the diameter and the wall thickness of vinylidene chloride polymer tubes, during the course of their generation in the production of film.

Crystalline vinylidene chloride polymers have certain peculiar properties which make necessary the use of special technics in manufacturing films therefrom. The principal processes for producing strong flexible films from crystalline vinylidene chloride polymers are described by W. T. Stephenson in his copending application, Serial No. 721,738, filed January 13, 1947 now U. S. Patent No. 2,452,080; and by C. R. Irons and C. E. Sanford in copending application Serial No. 615,276, filed September 10, 1945 now U. S. Patent No. 2,448,433. In outline, these processes comprise the steps of extruding the normally crystalline polymer in a fused and non-crystalline condition through a tube-forming orifice downwardly into a bath of cold water to provide a supercooled and temporarily non-crystalline tube of the polymer, passing said tube between pinch rolls, and distending said tube by fluid pressure from a gas or liquid contained within the tube beyond the pinch rolls to effect recrystallization of the polymer in the form of a thin-walled tube which may be slit to form a film. Said processes are applicable not only to the polymer of vinylidene chloride alone but also to those vinylidene chloride copolymers which are normally crystalline, as determined by X-ray diffraction studies. They apply to extrudable compositions of such normally crystalline polymers, whether plasticized or unplasticized. All such bodies are referred to herein as normally crystalline vinylidene chloride polymers.

In said processes, it is deemed a necessary practice to fill that portion of the freshly-extruded tube in the supercooling bath between the extrusion orifice and the pinch rolls with an inert liquid capable of providing enough lubrication to prevent the internal walls of the tube from adhering to one another when compressed by the pinch rolls. The amount of such liquid in the freshly extruded tube has been adjusted, in past practice, to affect the diameter and wall thickness of the tube. Thus, an increased head of oil tends to distend the tube and to reduce its wall thickness, and leads to the formation of slightly wider and thinner film sheets, while a decreased head of oil has the opposite effect, resulting in somewhat narrower and thicker films. It has been found, however, that reliance may not be had on control of the head of lubricating liquid within the tube to maintain a constant set of dimensions in the extruded and stretched film. Minor variations in operating conditions are reflected promptly as variations in the finished film.

Another disadvantage of the heretofore standard practices has been the necessity to provide different extrusion dies for each significant variation in the size of film which it is desired to produce. It would be preferable and much more economical if a single extrusion die could be used for the production of a great variety of widths and thicknesses of film. In general terms, a tube-forming orifice consists of a die plate with a round opening and a die mandrel disposed concentrically therewith. The die plate is the easier to produce and to remove from the apparatus. A simple substitution of one die plate for another, to provide more or less clearance from the fixed mandrel (or a similar substitution of one mandrel for another), would be far more desirable than the practice, now deemed necessary, of changing both the die plate and the mandrel whenever a significant change is desired in the size of film produced. Since a change only in the clearance between the die plate and the mandrel results only in an increase or decrease in the wall thickness of the hot tube as first extruded, and does not change its internal diameter, accurate control means must be provided to draw tubes of various thicknesses to the required diameter and wall thickness in the supercooled condition, so that, in turn, the recrystallization step accompanying the final fluid distension will provide the particular width and thickness desired in the finished film.

It is among the objects of the present invention to provide a method for the accurate control of the diameter and wall thickness of normally crystalline vinylidene chloride polymer tubes, during the course of their generation in the production of film. A related object is to provide such a method whereby any of a wide variety of widths and thicknesses of film may be produced at will using a single tube-forming die. Another object is to provide such a method whereby, with simple substitution of one die plate for another, and without change of the tube-forming mandrel, a still greater variety of film sizes may be produced. A particular object is to provide a method for augmenting the regulatory effect of the column of inert lubricating liquid normally maintained in that portion of a freshly extruded and non-crystalline tube of normally crystalline vinylidene chloride polymer between the downwardly directed extrusion orifice and the pinch rolls submerge in the supercooling bath.

A further object is to effect the desired control as aforesaid through the controlled imposition of pneumatic pressure over the column of inert lubricating fluid in the freshly extruded tube. Additional objects may be pointed out or become apparent from the further description of the invention.

I have found that the above-noted problems are overcome and that the foregoing objects are attained by the imposition of a controlled and small amount of pneumatic pressure in that portion of the hot plastic tube of vinylidene chloride polymer between the extrusion orifice and the upper levels of the supercooling bath, over the column of inert lubricating fluid in said tube. The superatmospheric pressure applied is of the order of 0.05 to 2 pounds per square inch, though with some copolymers higher pressures may be required. Such internal pressure, which should be insufficient to rupture the tube, inflates the hot tube immediately outside the extrusion orifice, before supercooling has occurred, and provides a tube, entering the supercooling bath, of any desired tube diameter. This diameter may be from 1.1 to 4 times that of the extrusion orifice. (After the tube has become supercooled, it will be stretched further, during the crystallization process, to from 3 to 5 times its supercooled diameter, or from about 3 to 20 times the diameter of the extrusion orifice.) With a given tube-forming mandrel in the extrusion head, it is possible, as well, to extrude the hot plastic tube with walls initially as thin or as thick as desired, by selection of an orifice plate which leaves the desired clearance about the centrally disposed mandrel. The greater the clearance between mandrel and orifice plate, the greater is the wall thickness of the tube as first extruded and, hence, the greater is the amount of distension which is possible before the tube attains the temporarily set and non-crystalline supercooled condition. The greater the wall thickness of the tube as first extruded, the wider is the possible variation in the superimposed pneumatic pressure and hence, in the width and thickness of the ultimate stretched and crystalline film. The use of superatmospheric pneumatic pressure, as described, is a much more effective means of regulating the dimensions of the tube, before final stretching, than is the previously employed method, in which reliance was had solely on the column of inert lubricant for regulation of the dimensions of the freshly extruded and non-crystalline tube. In any specific apparatus, little adjustment is possible in the distance from the extrusion orifice to the bottom of the supercooling bath, and, even though doubling this distance makes possible the use of an oil column of greater height, the resulting additional pressure is applied chiefly at the base of the oil column where the surrounding tube is already supercooled. Hence, unless the oil column were to extend above the level of the supercooling liquid, even large variations in its height have little effect on the diameter and wall thickness of the tube, relative to those now made possible.

In normal operation, the oil column extends from the immersed pinch rolls to a level near that of the supercooling bath, leaving an air space within the tube above the oil and beneath the extrusion orifice. In that region the tube is very soft and plastically distensible, as it is at a fusion temperature when it emerges from the orifice. A superatmospheric pressure of 0.05 pound may be obtained by supplying air to the said air space under the pressure of a 1.5-inch head of water. At ordinary temperatures, each foot of water exerts a pressure of about 0.43 pound per square inch, and a water column 4.5 feet high may be used to exert a pressure of 2 pounds per square inch on the air in the hot tube near the orifice.

The invention will be described with reference to the accompanying drawing, wherein Fig. 1 is an elevation, partially in section, representing functionally the essential features of the apparatus for carrying out the invention Fig. 2 is a fragmentary view showing the relative shape and size of the film if less air pressure is used than shown in Fig. 1; and, Fig. 3 is a similar fragmentary view showing the relative effect of using more air pressure than shown in Fig. 1.

A normally crystalline vinylidene chloride polymer 11 is fused and forwarded by a conveyor screw 12 in the barrel 13 of a plastics extruder. The fused polymer 11 is passed into a downwardly directed extrusion head 14 wherein the hot polymer 11 flows around a centrally disposed mandrel 15. The polymer 11 then flows through the tube-forming orifice 16, which is formed by die plate 17 which is attached to the lower face of head 14 and has a circular hole therein of slightly greater diameter than that of the concentrically mounted mandrel 15. The so-extruded polymer emerges from orifice 16 as a hot and very plastic tube 18 with walls several times the thickness of the desired final film. Tube 18 is passed into a body of cold water at a supercooling temperature, and is fed between pinch rolls 20 or equivalent constricting means, thence around guide roll 21, and finally through pinch rolls 22 and 23. The tube-forming mandrel 15 is axially bored and is connected at its upper end with a fluid inlet tube 24, through which oil or other inert lubricating liquid 25 is admitted to that portion of tube 18 which is in the supercooling bath 19 above the constricting means 20. That portion of tube 18 between rolls 22 and 23 is inflated with enough air to distend the tube radially as far as possible. This condition of inflation is recognized by the fact that the addition of further quantities of air to "bubble" 26 results in no further radial distension but rather in a lengthening of the bubble and movement of stretching zone "A" toward the pinch rolls 22. Rolls 20, 21, and 22 are set to operate at essentially the same peripheral speed, and this is adjusted to be no less than, and not over 10 per cent greater than the linear rate of extrusion of tube 18 from orifice 16. Rolls 23 operate at enough greater speed to take up the extra length of film produced during stretching. Tube 24, or a branch 27 thereof, is connected, through a regulating valve 28 having adjustments to provide constant outlet pressure, with a supply (not shown) of compressed air, which is admitted through tubes 27 and 24 and the mandrel 15 to that portion of the hot and plastic tube 18 between the orifice 16 and the column of lubricating liquid 25. Since the air pressure required to effect any desired distension of the hot and freshly extruded tube 18 is very small, a low pressure relief valve 29 is attached to line 27 to assure maintenance of the required low pressure inside the hot tube 18. Valve 29 may be simply constructed and may consist conveniently of a tube 30, dependent from and in open communication with the air inlet tube 27, dipping into a body of water 31 or other light liquid, of variable depth. When starting operations, the liquid 31 is withdrawn from around tube 30, and air, admitted through valve 28 is blown out through tube 30, the oil inlet valve 32 on line 24 being closed. Valve body 29, containing fluid 31 of known density is gradually raised over the end of relief tube 30, forming a hydrostatic head which determines accurately the pressure under which air is admitted to the plastic tube 18. When the right pressure is attained to distend tube 18 to the desired diameter and wall thickness, the depth of immersion of tube 30 in fluid 31 is measured, and this head of liquid is maintained. At ordinary room temperature, each foot of water exerts a pressure of about 0.43 pound per square inch, and any desired pressure from a fraction of an ounce to several pounds can be obtained readily by variation of the hydrostatic head. It is convenient to make the body of valve 29 of a glass cylinder having a visible scale thereon so that the depth to which tube 30 penetrates the water, alcohol, oil or similar light fluid therein may be measured accurately. The air pressure through valve 28 must always exceed the hydrostatic head of the liquid 31, to prevent underinflation of the hot plastic tube 18. The excess air so-supplied through valve 28 is vented through fluid 31 in relief valve 29. Thus, both overinflation and underinflation of tube 18 are prevented, and constant conditions prevail in the critical operation of adjusting the extruded tube 18 to the required diameter and thickness.

Through the use of the herein-described invention, it has become possible to produce film tubes of vinylidene chloride-vinyl chloride crystalline copolymers ranging from about 2.5 to 9 inches in diameter from a small extruder having a tube-forming orifice 0.87 inch in diameter, and with clearances between mandrel and die plate of from 0.030 to 0.060 inch, using a hydrostatic head of 2 to 5 inches of water on the air used to stretch the hot tube just below the orifice. In prior practice, a 3-inch or larger extruder has been necessary to produce a 9-inch film tube, and a series of smaller extruders (or orifices) has been needed to make the smaller tubes.

I claim:

In a method of making film from a normally crystalline vinylidene chloride polymer, wherein the polymer is fused, extruded in tubular form downwardly through air into a supercooling bath, constricted when supercooled beneath the surface of the bath, and thereafter stretched externally of the bath to effect recrystallization, a reduction in wall thickness and an increase in tube diameter, and wherein a column of inert lubricating liquid is maintained in that portion of the non-crystalline tube between the submerged constricting means and the extrusion orifice, the improvement which consists in providing and maintaining a constant superatmospheric pneumatic pressure sufficient to distend but insufficient to rupture the tube within that part of the hot, freshly extruded non-crystalline tube between the extrusion orifice and the said column of lubricating liquid, the said pneumatic pressure applied over the column of lubricating liquid being the only means used to regulate the wall thickness and diameter of the tube before it is supercooled.

CARROLL R. IRONS.

REFERENCES CITED

The following references are of record in the file of this patent:

UNITED STATES PATENTS

| Number | Name | Date |
| --- | --- | --- |
| 2,070,247 | Weingand et al. | Feb. 9, 1937 |
| 2,176,925 | Reichel et al. | Oct. 24, 1939 |
| 2,452,080 | Stephenson | Oct. 26, 1948 |
| 2,461,975 | Fuller | Feb. 15, 1949 |
| 2,461,976 | Schenk | Feb. 15, 1949 |